(12) United States Patent
Agrawal et al.

(10) Patent No.: US 12,175,611 B2
(45) Date of Patent: Dec. 24, 2024

(54) AUGMENTED REALITY (AR) MEASUREMENT DISPLAY

(71) Applicant: INTERNATIONAL BUSINESS MACHINES CORPORATION, Armonk, NY (US)

(72) Inventors: Tushar Agrawal, West Fargo, ND (US); Martin G. Keen, Cary, NC (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 18/055,068

(22) Filed: Nov. 14, 2022

(65) Prior Publication Data

US 2024/0161417 A1    May 16, 2024

(51) Int. Cl.
*G06T 19/00* (2011.01)
*G06F 3/01* (2006.01)

(52) U.S. Cl.
CPC ............ *G06T 19/006* (2013.01); *G06F 3/012* (2013.01); *G06F 3/013* (2013.01)

(58) Field of Classification Search
CPC ........ G06T 19/006; G06F 3/012; G06F 3/013
See application file for complete search history.

(56) References Cited

U.S. PATENT DOCUMENTS

| | | | |
|---|---|---|---|
| 9,122,053 B2 | 9/2015 | Geisner | |
| 9,122,321 B2 | 9/2015 | Perez | |
| 10,115,233 B2 | 10/2018 | Miller | |
| 2015/0287182 A1 | 10/2015 | Herger | |
| 2016/0124960 A1 | 5/2016 | Moser | |
| 2016/0171514 A1* | 6/2016 | Frank | G06Q 30/02 705/7.29 |
| 2017/0206691 A1* | 7/2017 | Harrises | G02B 27/0172 |
| 2021/0192819 A1* | 6/2021 | Du | G06F 3/017 |
| 2022/0005234 A1 | 1/2022 | Kwatra | |
| 2022/0253129 A1* | 8/2022 | Nguyen | G06F 3/011 |

OTHER PUBLICATIONS

Block., "12 Visualizations to Show a Single Number,"Accessed Aug. 7, 2022, 7 PGS, <https://www.displayr.com/12-visualizations-to-show-a-single-number/>.

(Continued)

*Primary Examiner* — Michelle Chin
(74) *Attorney, Agent, or Firm* — James L. Olsen

(57) ABSTRACT

Aspects of the present disclosure relate to augmented reality (AR) measurement display. A measurement of a quantity in an environment of a user currently using an AR device can be received. A preferred unit of measurement (UoM) for the measurement of the quantity can be selected based on an analysis of historical data of the user. The measurement of the quantity can be conceptualized by obtaining a virtual object associated with the measurement of the quantity. A command to display, on the AR device, the measurement of the quantity within the preferred UoM and the virtual object associated with the measurement of the quantity can be issued.

25 Claims, 6 Drawing Sheets

(56) References Cited

OTHER PUBLICATIONS

Disclosed Anonymously,., "Virtual Reality System That Uses Digital Twins to Visualize an Individual's Level of Adaptability", An IP.com Prior Art Database Technical Disclsoure, IP.com No. IPCOM/000261908, Apr. 16, 2020, 3 PGS.
Disclosed Anonymously., "Method and System for Providing a Virtual Reality Technology That Displays a 360 Degree Virtual Replication of an Actual Room", An Ip.com Prior Art Database Technical Disclosure , IP.com No. PCOM/000242917, Aug. 28, 2015, 3 PGS.
Dreamstime, "Caution hot sign. Hot coffee," Accessed Aug. 7, 2022, 14 PGS, <https://www.dreamstime.com/caution-hot-sign-coffee-image109260319>.
Ferrer et al., "Virtual humans for temperature visualization in a tangible augmented reality educational game," 978-1-5386-1892-9/2017 IEEE Virtual Reality Workshop on K-12 Embodied Learning through Virtual & Augmented Reality (KELVAR), 2017, 6 PGS.
Hickey et al., "Implementation of a Picture Based User Interface to Assist the Elderly Suffering From Memory Problems." In Proceedings of the 8th International Conference on Virtual Reality Continuum and its Applications in Industry (VRCAI '09). ACM, 978-1-60558-912-1/09/0012, 6 PGS.
IBM Research—Haifa., "Computer Vision and Augmented Reality", Accessed Aug. 18, 2022, 13 PGS, <https://web.archive.org/web/20220125122655/https://research.ibm.com/haifa/dept/imt/cvar/index.html>.
Softengi, "Disruptive Technologies in Risk Management: XR/AI," ,Accessed Aug. 7, 2022, 5 PGS, <https://softengi.com/blog/disruptive-technologies-in-risk-management-extended-reality/>.

\* cited by examiner

AUGMENTED REALITY (AR) MEASUREMENT DISPLAY

BACKGROUND

The present disclosure relates generally to the field of computing, and in particular, to augmented reality (AR) based measurement display.

Augmented reality devices are wearable computer-capable devices that generate virtual objects, such as three-dimensional images, text, animations, and videos, to overlay onto the wearer's field of vision to enable the wearer to view and interact with the virtual objects. Augmented reality merges the real world and the virtual world to create an immersive experience. AR devices can track position and orientation of a user such that alignment between virtual objects rendered on an AR display and the real world can be attained.

Measurement is the act of quantifying attributes of objects/events. Measuring a quantity can include using measurement instrumentation to determine the magnitude of a physical quantity as compared to a basic reference quantity of the same kind. A unit of measurement (UoM) is a definite magnitude of a particular quantity. Units of measurement are defined to be used as standards for measurement of the same kind of quantity. Quantities can be expressed in multiple units of measurement. Example quantities that can be expressed in various units of measurement include length, temperature, time, mass, current, and luminous intensity, among others.

In certain situations, users may be unable to conceptualize a measurement value. For example, a user may be unfamiliar with a particular unit of measurement (UoM) (e.g., inches/feet versus centimeters/meters) of the measured value or a particular physical quantity in general. There is a need in the art to provide improved techniques for rendering augmented reality virtual objects on augmented reality displays to enhance user experiences, and in particular, to aid users in understanding/conceptualizing measured values.

SUMMARY

Aspects of the present disclosure relate to a computer program product, system, and method for augmented reality (AR) measurement display. A measurement of a quantity in an environment of a user currently using an AR device can be received. A preferred unit of measurement (UoM) for the measurement of the quantity can be selected based on an analysis of historical data of the user. The measurement of the quantity can be conceptualized by obtaining a virtual object associated with the measurement of the quantity. A command to display, on the AR device, the measurement of the quantity within the preferred UoM and the virtual object associated with the measurement of the quantity can be issued.

The above computer program product, system, and method for AR measurement display provide various improvements. First by displaying measured quantities on the AR device, measurement values associated with measured objects/events within the user's environment can be conveniently viewed on the AR device. Further, by displaying the measured value in a UoM that is familiar to the user (e.g., based on their historical measurement data), the measured value can be more easily understood by the user. Further still, by obtaining and displaying a virtual object associated with the measured value on the AR device, the measured value can be conceptualized in a way that allows the user to more easily understand the measured value.

Embodiments of the present disclosure also relate to an AR device comprising one or more processors, a display, a tracking system, and one or more computer-readable storage media collectively storing program instructions which, when executed by the one or more processors, are configured to cause the one or more processors to perform a method. The method can include determining that a measured quantity of an object viewed through the AR device should be displayed on the display. The method can further include displaying a preferred unit of measurement (UoM) for the measured quantity and a virtual object associated with the measured quantity in a location on the display based on tracking data received from the tracking system.

The above AR device provides various improvements. First by displaying measured quantities on the AR device, measurement values associated with measured objects within the user's environment can be conveniently viewed on the AR device. Further, by displaying the measured value in a UoM that is familiar to the user (e.g., based on their historical measurement data), the measured value can be more easily understood by the user. Further still, by obtaining and displaying a virtual object associated with the measured value on the AR device, the measured value can be conceptualized in a way that allows the user to more easily understand the measured value. Further still, by displaying the measured quantity, UoM, and virtual object in a location on the AR display based on tracking, the measured quantity, UoM, and virtual object can be displayed adjacent to, proximate to, or otherwise spatially related to a measured object viewable through the AR device. This can allow the user to conveniently see measured quantities nearby objects on the AR display.

Embodiments of the present disclosure also relate to a method comprising determining that a measured quantity of an object viewed through an augmented reality (AR) device should be displayed on a display of the AR device and displaying a preferred unit of measurement (UoM) for the measured quantity and a virtual object associated with the measured quantity in a location on the display of the AR device based on tracking data received from a tracking system of the AR device.

The above AR device provides various improvements. First by displaying measured quantities on the AR device, measurement values associated with measured objects within the user's environment can be conveniently viewed on the AR device. Further, by displaying the measured value in a UoM that is familiar to the user (e.g., based on their historical measurement data), the measured value can be more easily understood by the user. Further still, by obtaining and displaying a virtual object associated with the measured value on the AR device, the measured value can be conceptualized in a way that allows the user to more easily understand the measured value. Further still, by displaying the measured quantity, UoM, and virtual object in a location on the AR display based on tracking, the measured quantity, UoM, and virtual object can be displayed adjacent to, proximate to, or otherwise spatially related to a measured object viewable through the AR device. This can allow the user to conveniently see measured quantities nearby objects on the AR display.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
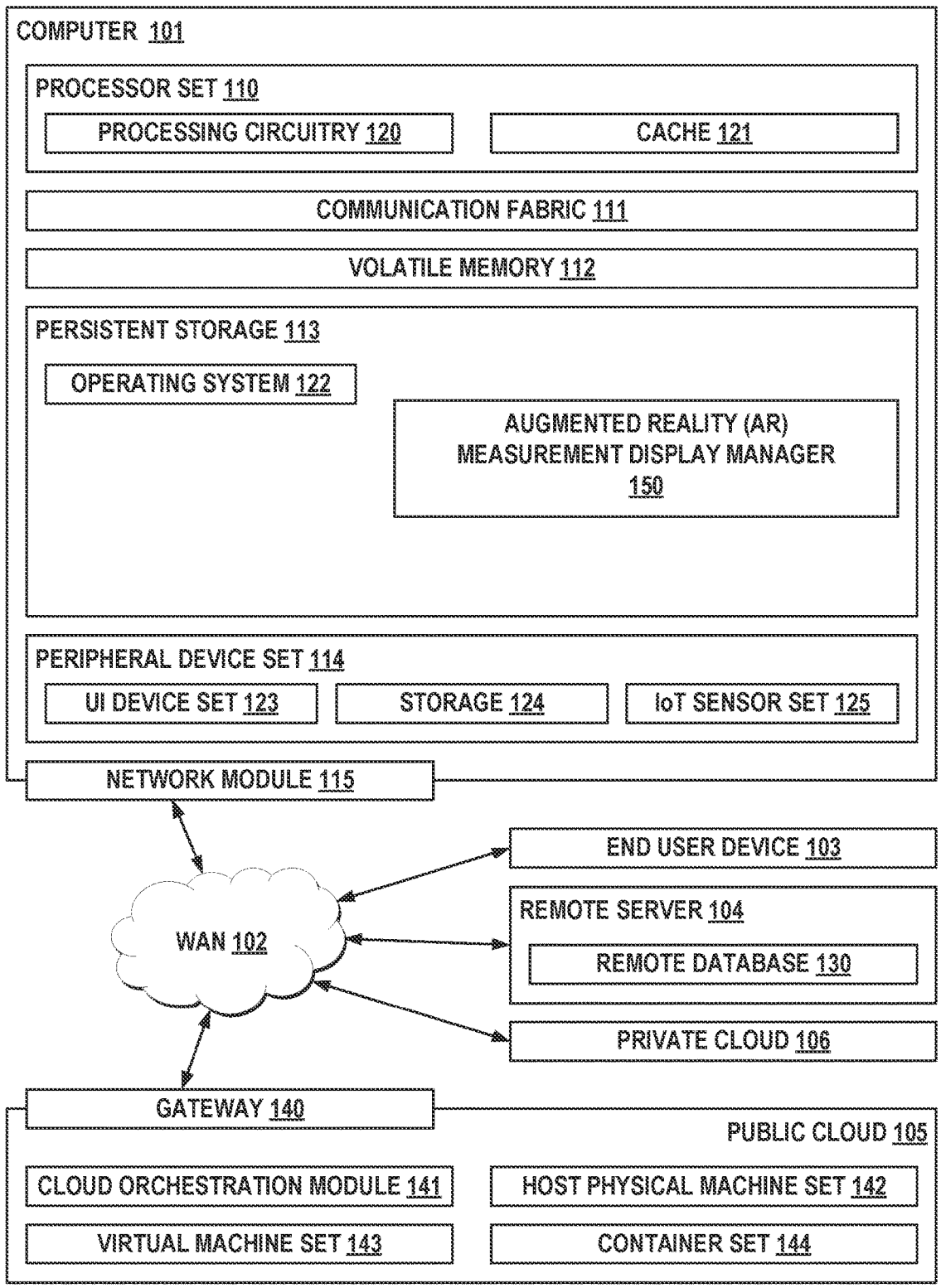
FIG. 1 is a high-level block diagram illustrating an example computer system and network environment that can be used in implementing one or more of the methods, tools, modules, and any related functions described herein, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing, and more particularly, to augmented reality (AR) based measurement display. While the present disclosure is not necessarily limited to such applications, various aspects of the disclosure may be appreciated through a discussion of various examples using this context.

Augmented reality devices are wearable computer-capable devices that generate virtual objects, such as three-dimensional images, text, animations, and videos, to overlay onto the wearer's field of vision to enable the wearer to view and interact with the virtual objects. Augmented reality merges the real world and the virtual world to create an immersive experience. AR devices can track position and orientation of a user such that alignment between virtual objects rendered on an AR display and the real world can be attained.

Measurement is the act of quantifying attributes of objects/events. Measuring a quantity can include using measurement instrumentation to determine the magnitude of a physical quantity as compared to a basic reference quantity of the same kind. A unit of measurement (UoM) is a definite magnitude of a particular quantity. Units of measurement are defined to be used as standards for measurement of the same kind of quantity. Quantities can be expressed in multiple units of measurement. Example quantities that can be expressed in various units of measurement include length, temperature, time, mass, current, and luminous intensity, among others.

In certain situations, users may be unable to conceptualize a measurement value. For example, a user may be unfamiliar with a particular unit of measurement (UoM) (e.g., inches/feet versus centimeters/meters) of the measured value or a particular physical quantity in general. In these instances, it may be beneficial to aid the user by providing them with a UoM they are familiar with. It may also be beneficial to conceptualize the measurement of the physical quantity in a manner that is familiar to them. There is a need in the art to provide improved techniques for rendering augmented reality virtual objects on augmented reality displays to enhance user experiences. In particular, there is a need to supplement users with useful information about measured quantities within their environment to aid the user in understanding the measured quantities.

Aspects of the present disclosure relate to augmented reality (AR) measurement display. A measurement of a quantity in an environment of a user currently using an AR device can be received. A preferred unit of measurement (UoM) for the measurement of the quantity can be selected based on an analysis of historical data of the user. The measurement of the quantity can be conceptualized by obtaining a virtual object associated with the measurement of the quantity. A command to display, on the AR device, the measurement of the quantity within the preferred UoM and the virtual object associated with the measurement of the quantity can be issued.

Aspects of the present disclosure provide various improvements. First by displaying measured quantities on the AR device, measurement values associated with measured objects/events within the user's environment can be conveniently viewed on the AR device. Further, by displaying the measured value in a UoM that is familiar to the user (e.g., based on their historical measurement data), the measured value can be more easily understood by the user. Further still, by obtaining and displaying a virtual object associated with the measured value on the AR device, the measured value can be conceptualized in a way that allows the user to more easily understand the measured value. Additionally, as various embodiments can utilize machine learning for determining preferred UoMs and conceptualizing measured values, computing efficiency of the system can be improved as the machine learning algorithms are trained over time. Further still, as various embodiments can utilize a tracking system associated with the AR device, the measured quantity, UoM, and virtual object can be displayed adjacent to, proximate to, or otherwise spatially related to a measured object viewable through the AR device. This can allow the user to conveniently view measured quantities nearby objects on the AR display.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 is a high-level block diagram illustrating an example computing environment 100 that can be used in implementing one or more of the methods, tools, modules, and any related functions described herein, in accordance with embodiments of the present disclosure. Computing environment 100 contains an example of an environment for the execution of at least some of the computer code involved in performing the inventive methods, such as augmented reality (AR) measurement display manager 150. In addition, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some or all of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 includes the signal conduction paths that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, mixed reality (MR) headset, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
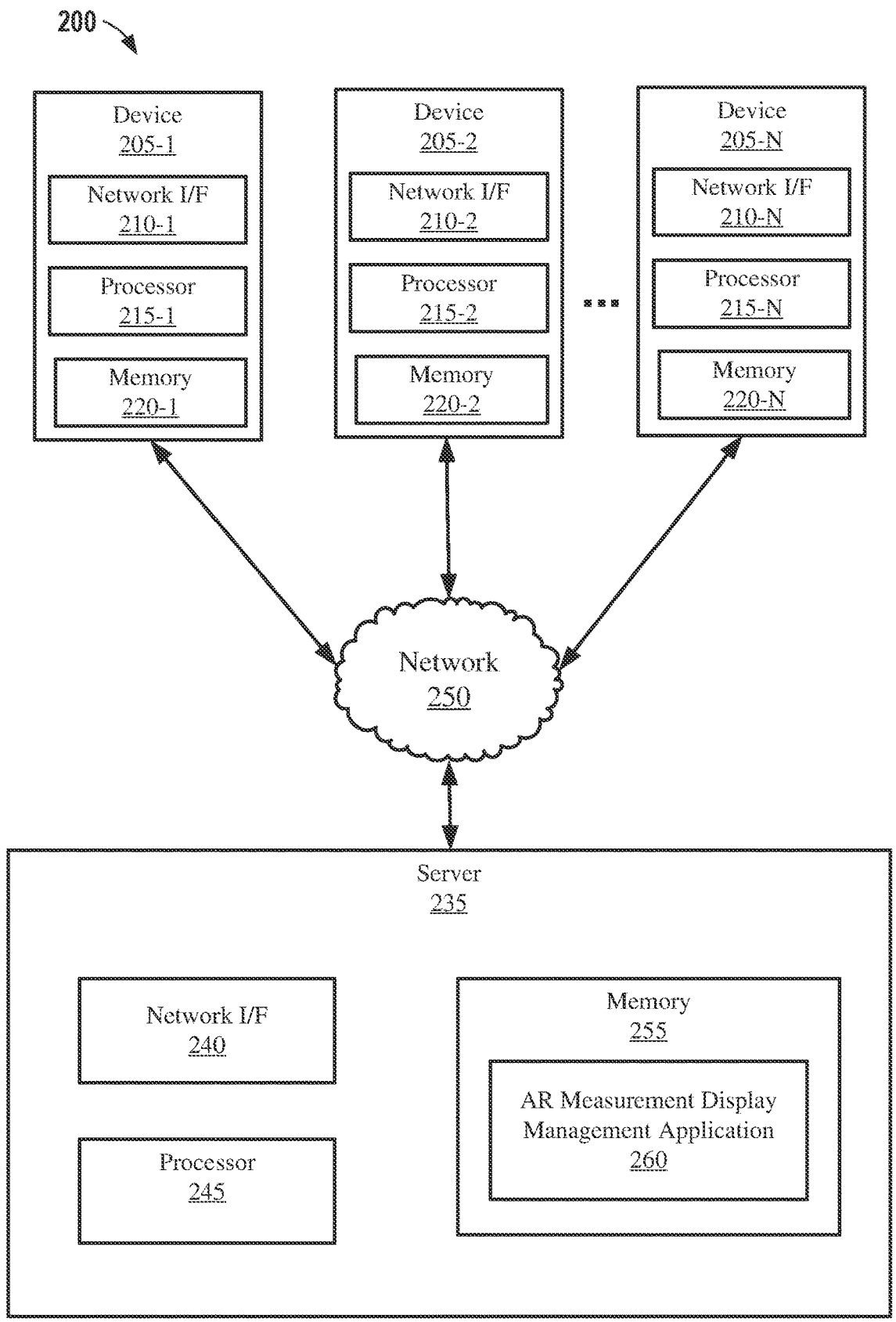
FIG. 2 is block diagram illustrating an example network environment, in accordance with embodiments of the present disclosure.

FIG. 2 is a block diagram illustrating an example computing environment 200 in which illustrative embodiments of the present disclosure can be implemented. Computing environment 200 includes a plurality of devices 205-1, 205-2 . . . 205-N (collectively devices 205), at least one server 235, and a network 250.

The devices 205 and the server 235 include one or more processors 215-1, 215-2, . . . , 215-N (collectively processors 215) and 245 and one or more memories 220-1, 220-2, . . . , 220-N (collectively memories 220) and 255, respectively. The processors 215 and 245 can be same as, or substantially similar to, processor set 110 of FIG. 1. The memories 220 and 255 can be the same as, or substantially similar to volatile memory 112 and/or persistent storage 113 of FIG. 1.

The devices 205 and the server 235 can be configured to communicate with each other through internal or external network interfaces 210-1, 210-2 . . . 210-N (collectively network interfaces 210) and 240. The network interfaces 210 and 240 are, in some embodiments, modems or network interface cards. The network interfaces 210 and 240 can be the same as, or substantially similar to, network module 115 described with respect to FIG. 1.

The devices 205 and/or the server 235 can be equipped with a display or monitor. Additionally, the devices 205 and/or the server 235 can include optional input devices (e.g., a keyboard, mouse, scanner, a biometric scanner, video camera, or other input device), and/or any commercially available or custom software (e.g., web conference software, browser software, communications software, server software, natural language processing software, search engine and/or web crawling software, image processing software, augmented reality/virtual reality (AR/VR) software, etc.). For example, devices 205 and/or server 235 can include components/devices such as those described with respect to peripheral device set 114 of FIG. 1. The devices 205 and/or the server 235 can be servers, desktops, laptops, or handheld devices. The devices 205 and/or the server 235 can be the same as, or substantially similar to, computer 101, remote server 104, and/or end user device 103 described with respect to FIG. 1.

The devices 205 and the server 235 can be distant from each other and communicate over a network 250. In some embodiments, the server 235 can be a central hub from which devices 205 can establish a communication connection, such as in a client-server networking model. Alternatively, the server 235 and devices 205 can be configured in any other suitable networking relationship (e.g., in a peer-to-peer (P2P) configuration or using any other network topology).

In some embodiments, the network 250 can be implemented using any number of any suitable communications media. In embodiments, the network 250 can be the same as, or substantially similar to, WAN 102 described with respect to FIG. 1. For example, the network 250 can be a wide area network (WAN), a local area network (LAN), an internet, or an intranet. In certain embodiments, the devices 205 and the server 235 can be local to each other and communicate via any appropriate local communication medium. For example, the devices 205 and the server 235 can communicate using a local area network (LAN), one or more hardwire connections, a wireless link or router, or an intranet. In some embodiments, the devices 205 and the server 235 can be communicatively coupled using a combination of one or more networks and/or one or more local connections. For example, the first device 205-1 can be hardwired to the server 235 (e.g., connected with an Ethernet cable) while the second device 205-2 can communicate with the server 235 using the network 250 (e.g., over the Internet).

In some embodiments, the network 250 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 250. In embodiments, network 250 can be coupled with public cloud 105 and/or private cloud 106 described with respect to FIG. 1.

The server 235 includes an augmented reality (AR) measurement display management application (AMDMA) 260. The AMDMA 260 can be configured to display measurement information associated with measured quantities (i.e., measured values, measured physical property values, measured physical quantities, etc.) in an environment of an augmented reality (AR) user. In particular, the AMDMA 260 can be configured to display measured values and associated selected units of measurement (UoMs) of measured objects/events on the AR device. Further, the AMDMA 260 can be configured to conceptualize the measured values by generating virtual objects (e.g., images, text, animations, graphs, etc.) that provide understanding of the measured values for display on the AR device.

The AMDMA 260 can first be configured to collect, receive, or otherwise obtain historical measurement data associated with users that opt-in to the functionalities of the AMDMA 260. The historical measurement data can indicate past measurements that users have observed. For example, the historical measurement data for each individual user can indicate measured values of quantities, respective UoMs of measured values of quantities, and a context in which each measured value was collected/observed by the user. See Table 1 below for exemplary historical measurement data.

The AMDMA 260 can then be configured to identify a user utilizing an AR device for which AR based measurement display is to be performed. The identity of the user currently utilizing the AR device can be initially determined such that historical data associated with the user can be obtained for generating personalized measurement information (e.g., UoMs and virtual objects) on the AR device.

The AMDMA 260 can then be configured to receive a measurement of a physical quantity (e.g., length, mass, amount, pressure, force, velocity, etc.) within an environment of the AR user. The physical quantity can be measured in any suitable manner. In embodiments, measurement of the physical quantity can be performed by one or more internet of things (IoT) sensors (e.g., network capable measurement sensors such as thermometers, optical sensors, digital scales, timers, speedometers, ammeters, etc.) and/or electronic/physical measurement instrumentation (e.g., a ruler, caliper, a balance, etc.). Measurement can occur automatically (e.g., via an automated sensor) and/or manually (e.g., by the AR user). Ultimately, the measurement of the physical quantity can be received by the AMDMA 260 (e.g., via transmission over network 250).

The AMDMA 260 can be configured to determine whether the measured physical quantity should be displayed through the AR device. In embodiments, determining whether the measured physical quantity should be displayed through the AR device can be completed based on historical data of the user. For example, if the user has frequently observed the measured physical quantity in the past, then display on the AR device may not be necessary. However, if the user has infrequently observed the measured physical quantity (e.g., below a threshold observation frequency) in the past, then AMDMA 260 can determine that the measured physical quantity should be displayed on the AR device. In some embodiments, determining that the measured value should be displayed on the AR device can be completed automatically based on the user completing the measurement (e.g., as recognized by one or more sensors, such as a front-facing camera of the AR device). In some embodiments, determining that the measured value should be displayed on the AR device can be completed based on a user request (e.g., the user manually indicates (on a graphical user interface (GUI)) of the AR device) that they desire display of the measured physical quantity).

Upon determining that the measured physical quantity should be displayed for the user, the AMDMA 260 can determine a preferred UoM for the measured quantity. The preferred UoM for the measured quantity can be determined based on historical data associated with the user. For example, UoMs can be selected based on how often the user has handled/observed respective UoMs in the past. In some embodiments, UoMs to select for the user can depend on a current location of the user (e.g., certain geographic regions may utilize the Metric System and other geographic regions may use the English System, among other). However, selection of the preferred UoM can be completed in any other suitable manner.

In embodiments, AMDMA 260 can be configured to determine whether conceptualization of the measurement of the physical quantity is required. "Conceptualization" of a measurement can include retrieval/generation of a virtual object associated with the measured quantity for display on the AR device to aid the user in understanding the physical quantity value. Virtual objects that can be displayed on the AR device to aid the user in understanding the measured physical quantity include images, text, graphs, charts, animations, videos, and other potential virtually displayable objects. As an example, if a measured temperature value in Celsius is to be displayed to a user, then conceptualization can include displaying an object that corresponds to the temperature (e.g., a similar temperature value, within a particular range of the temperature value, etc.) that the user has experienced in the past on the AR device. As another example, if a measured volume in m³ is to be displayed to a user, then conceptualization can include displaying an object which has approximately the same, or a similar, volume that the user has experienced in the past on the AR device.

In some embodiments, conceptualization can include displaying a ratio, chart, graph, or other mathematical expression depicting a relationship between the measured value and another value known to the user. For example, if a measurement of the speed of a vehicle is to be displayed to a user, then conceptualization can include displaying a ratio between the measured speed and the speed of an object which the user has encountered in the past (e.g., "the car is traveling four times faster than your top speed on a bicycle"). However, conceptualization can be completed in any suitable manner. Any suitable virtual object can be retrieved/generated based on historical user data to aid the user in understanding the measured value.

In embodiments, determining whether conceptualization of the measured value is required can be completed based on historical data associated with the user. For example, if the user has infrequently observed the measured value (e.g., below an observation frequency threshold), a determination can be made that conceptualization of the measured quantity should be completed. However, determining that conceptualization of the measurement quantity is required can be completed in any other suitable manner. For example, determining that conceptualization of the measured quantity is required can be completed based on receiving a request from the user to conceptualize the measured quantity (e.g., received via an AR graphical user interface (GUI)). As another example, in embodiments, conceptualization can be performed based on the magnitude of the measured quantity (e.g., any value within a particular measured range can be automatically conceptualized).

The AMDMA 260 can then cause display of the measured value, UoM, and conceptualization data (e.g., one or more virtual objects to aid in understanding the measured value) on the AR device. In embodiments, the location of the measured value, UoM, and conceptualization data on the screen of the AR device can be selected/updated based on tracking of the user (e.g., pose tracking or gaze tracking). For example, the position and orientation of the user's head/gaze with respect to the measured physical object can be tracked such that the corresponding measurement data can be displayed adjacent to, proximate to, or otherwise spatially related to the measured object on the AR display.

Upon displaying the measured quantity in the preferred UoM with any reference conceptualization data, the AMDMA 260 can monitor future received measurements to determine whether they should be displayed on the AR device. Thus, the AMDMA 260 can be configured to receive sensor data indicating measured values of physical quantities in an AR user's environment continuously, intermittently, periodically, or over any other suitable time interval. Further, the AMDMA 260 can be configured to determine whether display and/or conceptualization of the measured values should be completed over any suitable time interval.

In embodiments, feedback regarding the displayed measured value in the preferred UoM and/or the displayed conceptualization virtual objects can be collected from the user after presentation to the user on the AR device. This can aid in modifying criteria (e.g., observation thresholds, weights/biases in machine learning algorithms, etc.) used to determine whether to display particular measured values, which UoMs are preferred by the user, and/or which conceptualization techniques/instances were effective for the user. In embodiments, the feedback can be fed into one or more machine learning algorithms that are configured to determine whether to display measured values, to select preferred UoMs, and/or to generate/retrieve conceptualization virtual objects for display.

In some embodiments, artificial intelligence/machine learning (AI/ML) algorithms can be used to determine whether to display a measured value on the AR device, to determine preferred UoMs for measured values, and/or for generating/retrieving conceptualization data to be displayed on the AR device. AI/ML algorithms that can be used to determine whether to display a measured value on the AR device, to determine preferred UoMs for measured values, and/or for generating/retrieving conceptualization data to be displayed on the AR device include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the data discussed with respect to AMDMA 260, AMDMS 305, and/or datastore 380 (discussed below) can be analyzed or utilized as training data using any of the aforementioned machine learning algorithms.

More specifically, the AI/ML algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other techniques.

It is noted that FIG. 2 is intended to depict the representative major components of an example computing environment 200. In some embodiments, however, individual components can have greater or lesser complexity than as represented in FIG. 2, components other than or in addition to those shown in FIG. 2 can be present, and the number, type, and configuration of such components can vary.

While FIG. 2 illustrates a computing environment 200 with a single server 235, suitable computing environments for implementing embodiments of this disclosure can include any number of servers. The various models, modules, systems, and components illustrated in FIG. 2 can exist, if at all, across a plurality of servers and devices. For example, some embodiments can include two servers. The two servers can be communicatively coupled using any suitable communications connection (e.g., using a WAN 102, a LAN, a wired connection, an intranet, or the Internet).

Though this disclosure pertains to the collection of personal data (e.g., historical measurement data), it is noted that in embodiments, users opt into the system. In doing so, they are informed of what data is collected and how it will be used, that any collected personal data may be encrypted while being used, that the users can opt-out at any time, and that if they opt out, any personal data of the user is deleted.

Figure 3:
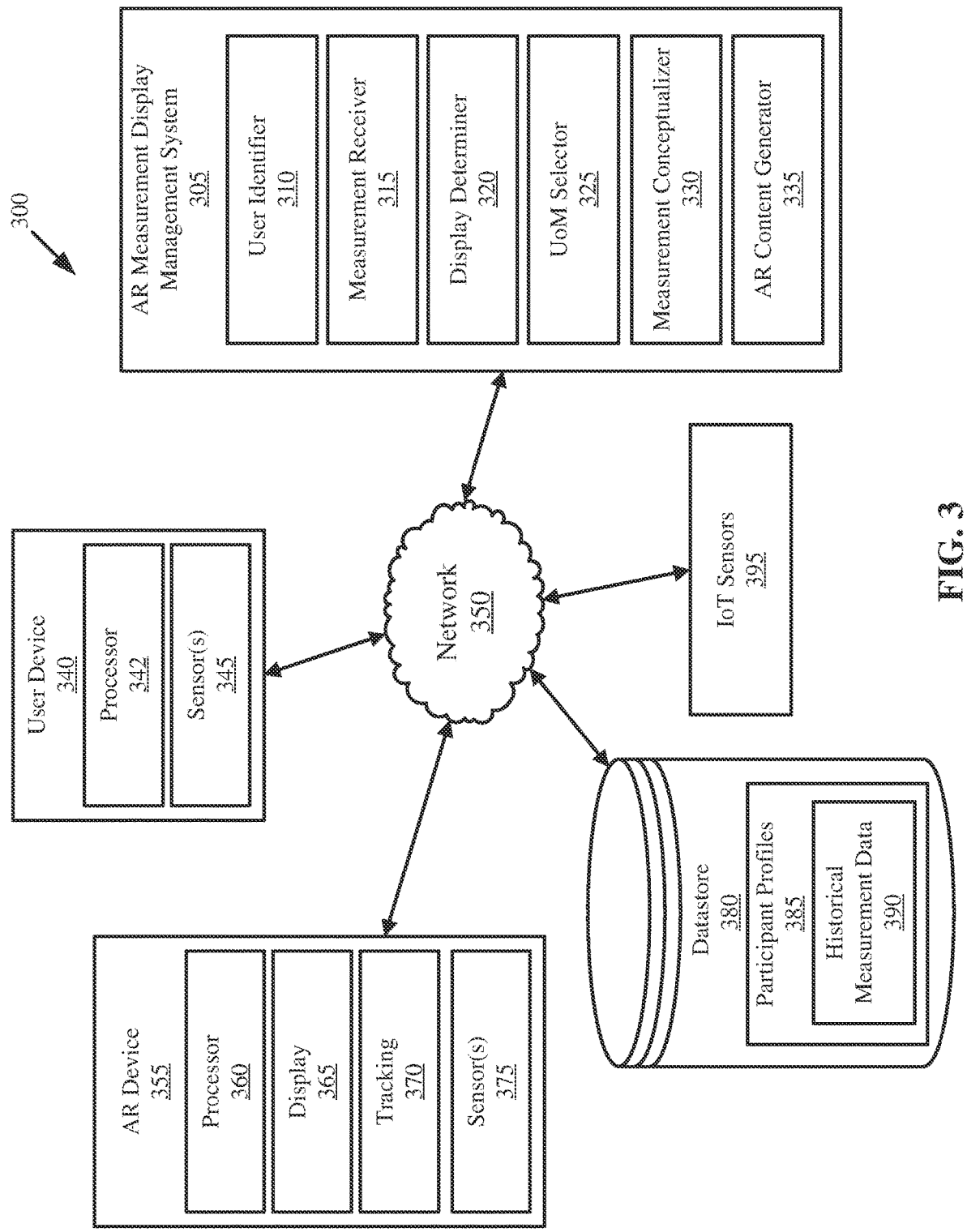
FIG. 3 is a block diagram illustrating an example network environment including an augmented reality (AR) measurement display management system, in accordance with embodiments of the present disclosure.

Referring now to FIG. 3, shown is a block diagram illustrating an example network environment 300 in which illustrative embodiments of the present disclosure can be implemented. The network environment 300 includes an augmented reality (AR) display management system (AMDMS) 305, a user device 340, an AR device 355, a datastore 380, and IoT sensors 395, each of which can be communicatively coupled for intercomponent interaction via a network 350. In embodiments, the network 350 can be the same as, or substantially similar to, network 250 and/or WAN 102. In embodiments, the user device 340, AR device 355, IoT sensors 395, and AMDMS 305 can be the same as, or substantially similar to, computer 101, devices 205, and/or server 235.

The AMDMS 305 can be configured to cause display of measured values, selected UoMs of measured values, and/or conceptualization data of measured values on the AR device 355. The data to be displayed on the AR device 355 can be generated by AMDMS 305 and transmitted to AR device 355 for display (e.g., the AMDMS 305 may instruct AR device 355 regarding content to be displayed), or may be generated directly by AR device 355. Ultimately, the AR device 355 receives/generates measured values, selected UoMs of measured values, and/or conceptualization data of measured values for display on display 365. This can enable a user to view/understand measured values of quantities of physical objects within their environment.

The AR device 355 includes a processor 360, a display 365 (e.g., a screen for displaying digital content), tracking 370 (e.g., position, orientation, and gaze tracking), and sensors 375 (e.g., a front facing camera for computer vision, sensors for receiving measurements of physical quantities, etc.). In embodiments, tracking 370 can include receiving a gazed image (e.g., detected by eye tracking cameras) on which tracked eyes are fixed and determining coordinates of an axis of a line-of-sight, also referred to as a sightline or visual axis, the user is viewing within the field of vision captured by the tracking 370. This can aid in updating locations of measurement information to be displayed on the display 365 of the AR device 355. AR device 355 can be a wearable computer-capable device that generates digital information, such as three-dimensional images, text, animations, and videos, to overlay into the wearer's field of vision so the digital information is viewable along with real world scenes in the wearer's field of vision.

The AR device 355 may include components found in smartphones, tablet computers, and other modern computer technology. AR rendering may be performed by optical projection systems, monitors, handheld devices, graphical processing units, and/or display systems worn on the human body. A head-mounted display (HMD) is a display device worn on the forehead, such as a harness or a helmet which can support AR device interface to a human body. In embodiments, tracking 370 can be configured to perform six degrees of freedom monitoring that allows the AR device 355 to align virtual information to the physical world and adjust accordingly with the AR user's head movements. The AR device 355 may also implement gesture controls for enhanced immersion.

In embodiments, AR device 355 may be implemented as eyeglasses and employ cameras to capture real world views such that AR imagery can be displayed on the display 365 in particular locations. In embodiments, the AR device 355 can include a head-up display (HUD), which can be a transparent display that presents data without requiring users to look away from their usual viewpoints. AR device 355 can alternatively or additionally be implemented as contact lenses and/or virtual retinal displays, where a display is superimposed directly over the retina of a viewer's eye. For example, EyeTap augmented reality devices can capture rays of light that would otherwise pass through the center of the lens of the wearer's eye, and can substitute synthetic computer-controlled light for each ray of light. Sensors 375 of AR device 355 can include, among others potential sensors, digital cameras and/or other optical sensors, accelerometers, a global positioning system (GPS), gyroscopes, solid state compasses, and radio-frequency identification (RFID).

The user device 340 includes a processor 342 and sensors 345. In embodiments, the user device 340 can be a personal device (e.g., a smart phone) of the AR user which enables the user to interface (e.g., control, manage, view, etc.) the AMDMS 305. For example, an application (e.g., AMDMA 260) which allows the user to change configuration settings of functionalities of the AMDMS 305 can be installed on the user device 340. This can allow the user to set measurement display timing preferences, set UoM preferences, upload/define contextual data associated with measured values, and set conceptualization preferences, among other configuration settings.

The AMDMS 305 includes a user identifier 310, a measurement receiver 315, a display determiner 320, a UoM selector 325, a measurement conceptualizer 330, and an AR content generator 335. The functionalities of the user identifier 310, measurement receiver 315, display determiner 320, UoM selector 325, measurement conceptualizer 330, and AR content generator 335 can be processor-executable instructions that can be executed by a dedicated or shared processor using received inputs.

The user identifier 310 can be configured to determine an identity of an augmented reality (AR) user currently using the AR device 355. This can be completed such that a participant profile 385 corresponding to the identified user can be retrieved from datastore 380. Upon retrieving the participant profile 385 of the identified user, historical measurement data 390 of the user can be obtained such that processing by AMDMS 305 can be completed for displaying measured values, selecting UoMs (based on the historical measurement data 390), and retrieving/generating conceptualization data (based on the historical measurement data 390) on the AR device 355. Each participant profile 385 can correspond to a user that opts into the functionality of the AMDMS 305 such that measured values can be displayed in a manner that is personalized to each user. That is, the historical measurement data 390 corresponding to each user can aid each user in understanding new measurements that occur by enabling selection of UoMs and generating conceptualization data that is familiar to each respective user.

Identification of users by the user identifier 310 can be completed in any suitable manner. In embodiments, users can manually indicate their identity via login to the AMDMS 305 functionality through a user account, via a biometric scanner (e.g., facial recognition and/or fingerprint scanning), or otherwise manually indicating their identity to the AMDMS 305. In embodiments, the user identifier 310 can automatically determine the identity of the user of the AR device 355 (or another AR device) via fingerprint scanning, facial recognition, voice recognition, based on user dimensions, or in any other suitable manner.

The measurement receiver 315 can be configured to receive a measurement of a physical quantity in an environment of the AR user. Measurements can be made in any suitable manner. In embodiments, measurements can be completed by one or more of the devices within computing environment 300. For example, sensors 345 of user device 340, sensors 375 of AR device 355, and/or IoT sensors 395 can be configured to measure any suitable physical quantity. Physical quantities that can be measured include length, area, volume, flow rate, mass, time, angle, energy, velocity, acceleration, temperature, luminous intensity, sound amplitude, current, resistance, pressure, amount, concentration, frequency, force, power, conductance, and capacitance, among other physical quantities. Instrumentation capable of measuring the above referenced physical quantities can be implemented within the sensors 345, 375, or 395 such that measurements can be received within an environment of the AR device 355. In embodiments, measurements can be collected by IoT enabled sensors and transmitted over network 350 to measurement receiver 315 of AMDMS 305. In embodiments, measurements can be made by electronic/physical instrumentation which is not network enabled (e.g., such as a ruler, caliper, barometer, thermostat, speedometer, etc.). In these embodiments, the measured value can be received as manually indicated by the user of the AR device 355, as recognized by a device within the computing environment 300 (e.g., via a camera using computer vision), or in any other suitable manner.

Though reference is made to certain types of conventional sensors/measurement instrumentation that can measure physical quantities, it is noted that an exhaustive list of all possible measurement instrumentation is not provided herein. Aspects of the present disclosure recognize that any suitable measurement instrumentation can be used to receive measurements of any suitable respective physical quantity without departing from the spirit and scope of the present disclosure.

In embodiments, measurements can be automatically collected within an environment of the AR user. That is, sensor data collected from sensors which are running in the background (e.g., continuously, intermittently, periodically, or over any other suitable time interval) can be received by the measurement receiver 315. In embodiments, measurements can be collected as initiated by the AR user or another user in the AR user's environment. For example, the AR user can directly measure a physical quantity with respective measurement instrumentation. As another example, the AR user can instruct, command (e.g., a voice command), or otherwise cause measurement instrumentation to collect a measurement value of a quantity in their environment.

The display determiner 320 can be configured to determine whether a measurement received by the measurement receiver 315 should be displayed on the display 365 of the AR device 355. Determining whether to display a measurement on the AR device 355 can be completed in any suitable manner. In embodiments, any received measurement can automatically be determined to be displayed on the AR device 355. In embodiments, measured quantities that fall within a particular magnitude (e.g., above a threshold magnitude, below a threshold magnitude, within a range) can be determined to be displayed on the AR device. In embodiments, determining whether to display a measured value on the AR device can include querying the user to ascertain whether they desire to have the measurement displayed on their AR device. In these embodiments, if the user affirms the query (e.g., the user indicates they desire to have the measured quantity displayed), then a determination can be made that the measured value should be displayed.

In embodiments, historical measurement data 390 of the user can be referenced to determine whether the received measured value should be displayed on the AR device 355. Historical measurement data 390 can indicate past measurements observed/collected by the user, UoMs of associated past measurements, and/or contexts (e.g., time, location, sensor type, and activity in which measurement was taken) in which the past measurements have occurred.

Referring now to Table 1, shown is example historical measurement data 390 associated with an AR user, in accordance with embodiments of the present disclosure.

TABLE 1

| Historical Measurement Data | | | | |
|---|---|---|---|---|
| Measurement Value | UoM | Time | Location | Context |
| 3.5 | Meters (m) | 2:05 PM | Home Garage | Dimension of Furniture Collected by Measurement Application |
| 50 | Degrees Fahrenheit (° F.) | 4:45 PM | Work Parking Lot | Temperature Outside Collected from Car Sensor |
| 80 | Degrees Celsius (° C.) | 3:30 PM | Workshop | Temperature of Lathe Spindle Collected by Temperature Sensor |
| 165 | Degrees Fahrenheit (° F.) | 6:30 PM | Home Kitchen | Temperature of Cooked Chicken Collected by Meat Thermometer |
| 70 | Miles Per Hour (mph) | 7:30 AM | Highway | Speed of Car Collected by Speedometer of Car |
| 25 | Miles Per Hour (mph) | 7:30 PM | Bike Trail | Speed of Bicycle Collected by Speedometer of Bicycle |
| 1 | Cup (C) | 7:00 PM | Home Kitchen | Volume of Flour Measured by Measuring Cup |
| 150 | Yards (yd) | 8:00 AM | Golf Course | Distance to Pin from Tee Box Measured by Golf Range Finder |

TABLE 1-continued

| Historical Measurement Data | | | | |
|---|---|---|---|---|
| Measurement Value | UoM | Time | Location | Context |
| 72 | Degrees Fahrenheit (° F.) | 3:00 PM | Home | Temperature Inside Home Collected by Thermostat |

As shown in Table 1, various historical measurements, associated units of measurement (UoMs), time when the respective measurements were collected, location where the respective measurements were collected, and context associated with the collected measurements can be stored within historical measurement data 390. Though Table 1 depicts historical measurement data 390 as including measurements, UoMs, times, locations, and contexts, more or less data can be included within Table 1. Further, though a relatively limited number of measurement entries are included in Table 1, aspects of the present disclosure recognize that a large number (e.g., thousands or more) of measurements can be collected as historical measurement data 390. The historical measurement data 390 associated with each user can represent measurements collected over any suitable time interval (e.g., all-time, a year, 3 months, 1 week, etc.). The historical measurement data 390 can be used as input data for one or more processing modules described in computing environment 300. In embodiments, the historical measurement data 390 can be input into one or more AI/ML algorithms, as discussed with respect to FIG. 2.

In embodiments, historical measurement data 390 can be statistically analyzed, formatted, and/or organized. For example, frequencies at which each UoM has been captured within a given time interval can be ascertained by analyzing the historical measurement data 390. In embodiments, average values and a range for each measured quantity can be determined. In embodiments, organization of historical measurement data 390 can be completed such that measurement data can be filtered/viewed/grouped based on location, time, activity, or any other suitable contextual condition.

The historical measurement data 390 can be used to determine whether a measured quantity should be displayed by the display determiner 320. In embodiments, conditions can be set to dictate whether particular measured quantities should be displayed based on observation frequency (e.g., a number of occurrences) within historical measurement data 390. For example, assume a condition is set such that any measured value that falls below an observation frequency threshold leads to a determination that the measured value should be displayed on the AR device. Using this condition, if a determination is made, based on analyzing the historical measurement data 390, that a recently received measurement (e.g., a pressure measurement) has not been observed above the observation frequency threshold, then a determination can be made that the measurement of the quantity should be displayed on the AR device 355. This can be completed such that quantities that are routinely encountered are not displayed on the AR device 355 and quantities that are infrequently encountered are displayed on the AR device 355. However, determining that a measured quantity should be displayed on the AR device 355 via analysis of historical measurement data 390 can be completed in any other suitable manner. For example, in contrast to the example above, rather than only displaying quantities that are infrequently encountered, a condition can be set such that only quantities that are frequently encountered are displayed on the AR device (e.g., a condition can be set such that only measured quantities that exceed an observation frequency threshold are displayed).

The UoM selector 325 can be configured to select a preferred UoM for the received measured quantity. The UoM selector 325 can select the preferred UoM for the measured quantity in any suitable manner. In some embodiments, the UoM selector 325 can be configured to select the preferred UoM based on location. For example, certain units of measurement are more frequently used in particular geographic areas. For example, the English System is used more frequently in the United States whereas the Metric System is used more frequently in other countries. In some embodiments, the preferred UoM can be selected based on historical measurement data 390. For example, the preferred UoM can be selected based on the most frequently observed UoM associated with a particular physical quantity as indicated in the historical measurement data 390. As an example, referring to Table 1, if a new measurement for temperature is received, the preferred UoM can be selected as Degrees Fahrenheit (° F.), as it is the most commonly encountered temperature UoM observed by the user (e.g., three temperature readings were observed in ° F. whereas one temperature reading was observed in ° C.).

In embodiments, the UoM selector 325 can be configured to select a preferred unit of measurement using one or more AI/ML algorithms using historical measurement data 390 as input data. In these embodiments, the AI/ML algorithm (e.g., a neural network) can be trained to determine which UoM should be selected for the measured quantity based on the AR user's historical measurement data 390. The AI/ML algorithm can be trained to consider various factors within the historical measurement data 390 such as the context in which each previously measured value was recorded, the similarity between previously measured values and the current value, as well as previously observed UoMs for measurements of the same physical quantity. The trained AI/ML algorithm can then receive a current measured quantity and historical measurement data 390 of the user and automatically select a preferred UoM for the AR user based on the trained model.

The measurement conceptualizer 330 can be configured to determine whether conceptualization of the measured quantity is required, and if so, the measurement conceptualizer 330 can be configured to conceptualize the measured quantity. As discussed above, "conceptualization" of a measurement can include generating/retrieving a virtual object associated with the measured quantity for display on the AR device to aid the user in understanding the measured quantity. Virtual objects that can be displayed on the AR device to aid the user in understanding the measured physical quantity include images, text, graphs, charts, animations, videos, and other virtually displayable objects.

Determining whether conceptualization is to be completed for a given measured value that has been determined to be displayed on the AR device 355 can be completed in any suitable manner. In embodiments, determining that conceptualization is required can be completed based on an analysis of historical measurement data 390 for the user. For example, measured values of quantities that have been infrequently observed by the user can be determined to be conceptualized. As an example, similar to determining whether to display a measured value by the display determiner 320, an observation frequency threshold (which can be the same as, or different from, the observation frequency threshold described with respect to the display determiner 320) can be defined such that any measured quantities that have been observed less than the observation frequency threshold are determined to be conceptualized to aid the user in understanding the measured quantity. As such, aspects of the present disclosure recognize that a threshold observation frequency can be set to dictate whether particular measured quantities should be conceptualized. In embodiments, observation frequency thresholds can differ for each quantity. For example, an observation frequency threshold for a temperature measurement to dictate whether to conceptualize the temperature measurement may be relatively higher than an observation frequency threshold for a pressure measurement to dictate whether to conceptualize the pressure measurement (e.g., five or fewer recorded temperature measurements in historical measurement data 390 may be required for conceptualization of temperature measurements whereas three or fewer recorded pressure measurements in historical measurement data 390 may be required for conceptualization of pressure measurements).

In embodiments, any received measurement can automatically be determined to be conceptualized for the AR. In embodiments, measured quantities that fall within a particular magnitude (e.g., above a threshold magnitude, below a threshold magnitude, within a range) can be determined to be conceptualized. In embodiments, determining whether to conceptualize a measured value on the AR device can include querying the user to ascertain whether they desire to have the measurement conceptualized on their AR device. In these embodiments, if the user affirms the query (e.g., the user indicates they desire to have the measured quantity conceptualized), then a determination can be made that the measured value should be conceptualized.

The measurement conceptualizer 330 can conceptualize the measured quantity in any suitable manner. In embodiments, the context of the historically similar measured values of quantities within historical measurement data 390 can be referenced to determine conceptualization virtual objects to retrieve/generate. For example, if a user obtains a temperature measurement of a first object, the historical measurement data 390 can be analyzed to identify a reference object or context in which a similar temperature measurement was obtained. A virtual object corresponding to the reference object or context in which the similar temperature measurement was obtained can then be retrieved/generated as a virtual object. In embodiments, obtaining a virtual object corresponding to a reference object or context within historical measurement data can include searching online resources for corresponding virtual objects (e.g., videos, animations, or images). In embodiments, obtaining a virtual object corresponding to a reference object or context within historical measurement data 390 can include generation via a generative adversarial network (GAN) or other content generation algorithm.

Figure 5:
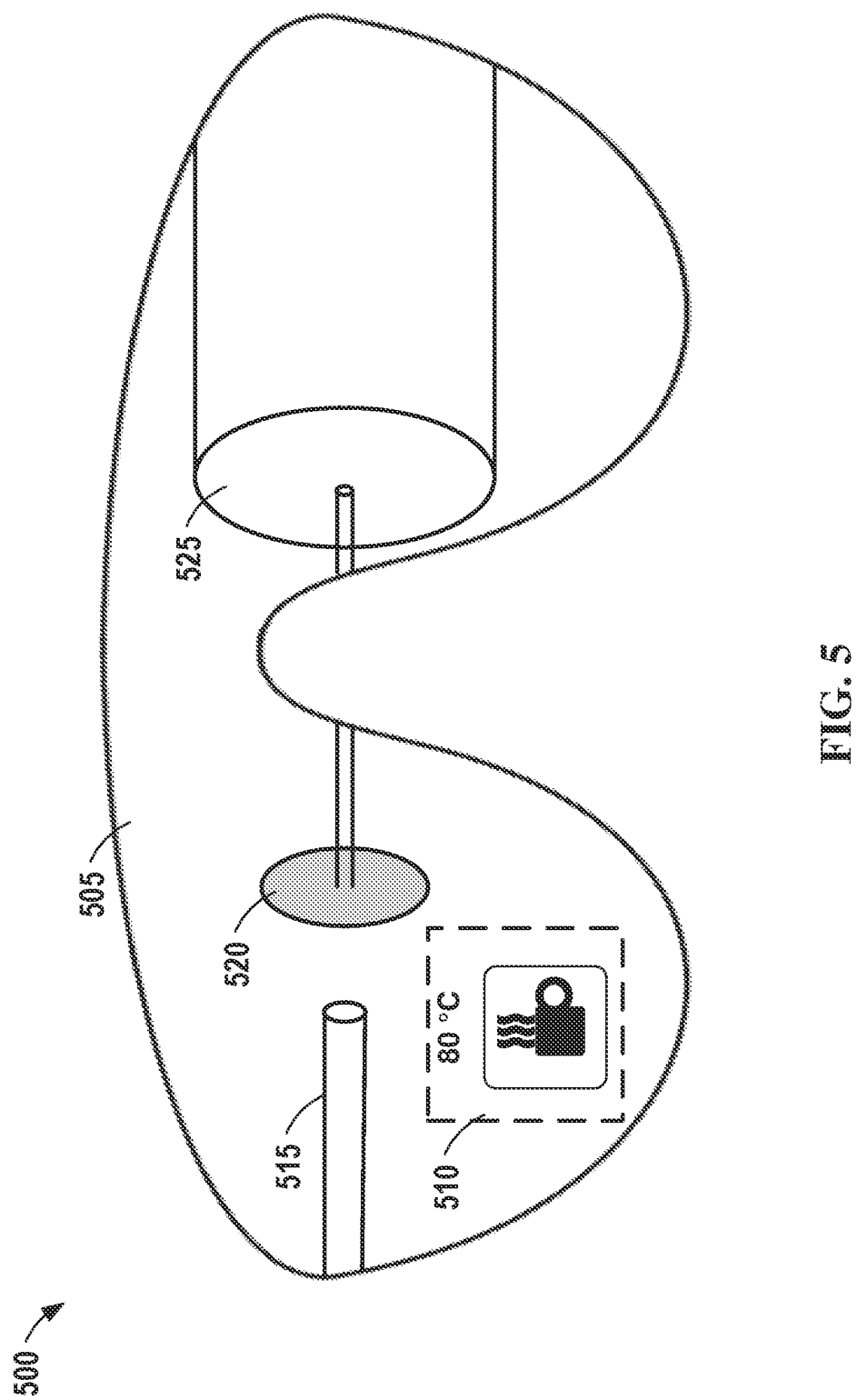
FIG. 5 is a diagram illustrating an example AR measurement display in a first scenario, in accordance with embodiments of the present disclosure.

As a detailed example for retrieving/generating a reference virtual object to conceptualize a measured temperature, FIG. 5 depicts a diagram 500 of a view through an augmented reality (AR) device 505 (e.g., AR device 355). As shown in FIG. 5, a lathe 525 recently cut a cylindrical piece of metal 515 using a cutting tool 520. The temperature of the cutting tool 520 is received (e.g., as measured by a temperature sensor associated with the lathe 525) upon cutting the metal 515. Upon receiving the temperature measurement from the temperature sensor, a preferred UoM of the measured temperature can be selected for display within the display element 510. In this example, the preferred UoM for the user is determined to be ° C. based on an analysis of the AR user's historical measurement data. Thus, the temperature 80° C. is displayed within the display element 510.

Further, the temperature measurement can be conceptualized by identifying a reference object based on an analysis of historical measurement data associated with the AR user. In this example, a hot cup of coffee is a reference object which was observed at a similar temperature (e.g., within contextual data of the historical measurement data) as the cutting tool 520. Thus, a hot cup of coffee symbol is retrieved (e.g., from a database or other online source) or generated (e.g., via a GAN model) and displayed within the display element 510 on the AR device 505. In this example, the AR user can more easily understand the temperature of the cutting tool 520 via selection of a familiar UoM and generation of conceptualization data (e.g., display of a familiar reference object) within display element 510 based on the user's historical measurement data.

It is noted that in this example, because of the dangers of working with heavy machinery such as a lathe 525, the AR device 505 can be configured as safety glasses capable of withstanding impacts and approved for use with such machinery.

In embodiments, the location of the display element 510 can be dynamic on the AR device 505 display. That is, the location of the display element 510 including the measured value (e.g., 80), the preferred UoM (e.g., ° C.), and the conceptualization data (e.g., a hot cup of coffee) can change based on the location of the measured object (e.g., the cutting tool 520). In this example, if the user changes their head position or gaze direction, tracking 370 can be configured to track the updated head position and/or gaze direction such that the location of display element 510 can be dynamically adjusted. For example, if the user changes their head position/gaze direction such that the cutting tool 520 is no longer visible within the visual field of AR device 505, then a determination can be made that the display element 510 no longer needs to be displayed.

Figure 6:
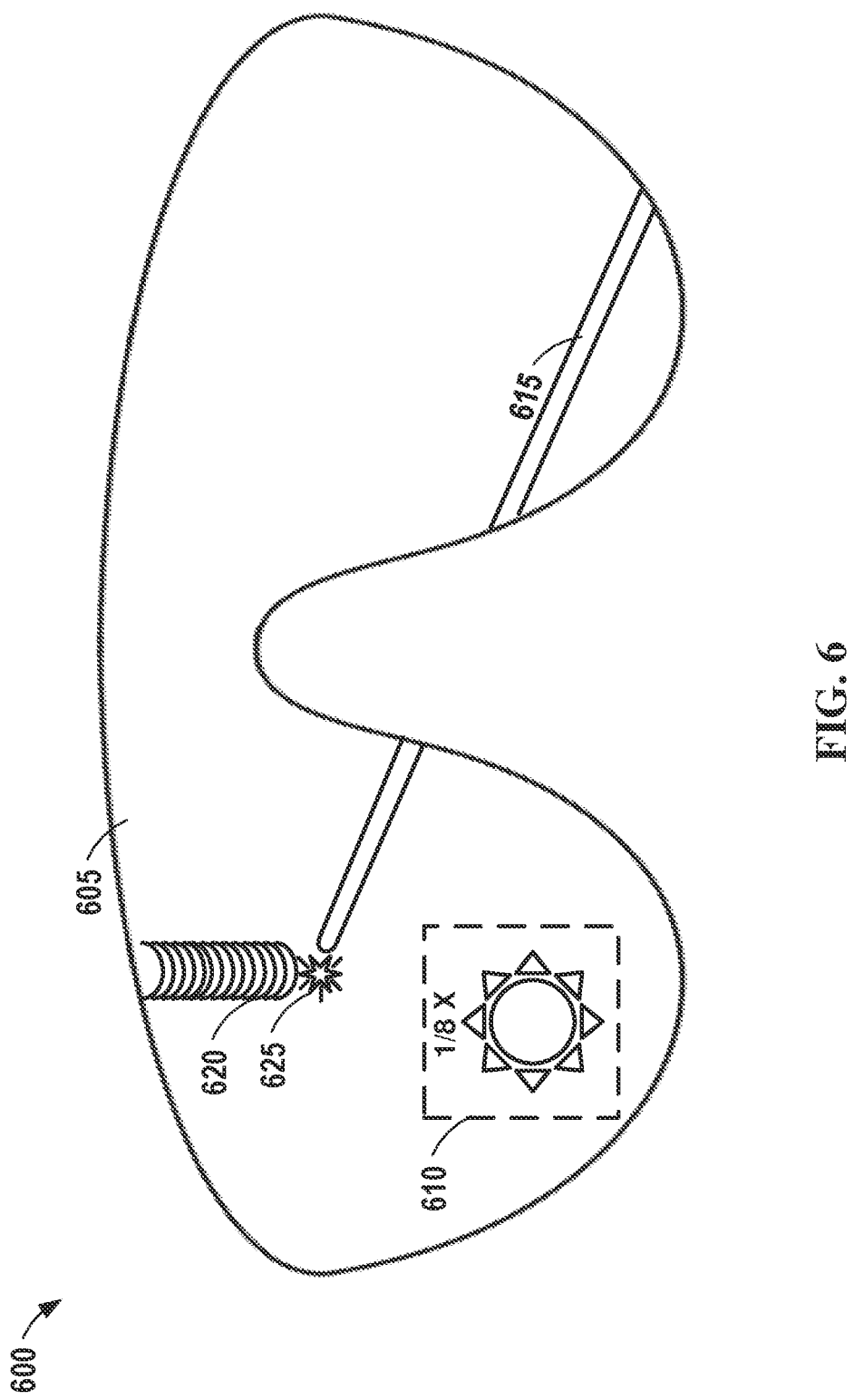
FIG. 6 is a diagram illustrating an example AR measurement display in a second scenario, in accordance with embodiments of the present disclosure.

In some embodiments, conceptualization by the measurement conceptualizer 330 can include retrieving/generating a mathematical expression (e.g., a chart, graph, ratio, etc.) depicting a relationship between the magnitude of measured value and another value known to the user (e.g., stored within historical measurement data 390). As a detailed example, referring now to FIG. 6, shown is a diagram 600 depicting a view through an AR device 605 (e.g., implemented as welding goggles or a welding mask) in which the AR user is performing welding. As shown in FIG. 6, the user is performing shielded metal arc welding ("stick welding") on a piece of metal. An electrode 615 coated with flux is used to lay the weld 620 (e.g., shown as weld beads 620). Light 625 is emitted as a result of the welding process, which can contain a large amount of ultra-violet (UV) light and be dangerous for the user's eyes. A measurement of the luminous intensity of the light 625 can be received (e.g., as collected by a chroma meter, light meter, or photometer) in an environment of the user. In this example, the measurement of the value of the luminous intensity may not be displayed. Rather, the measured value can be conceptualized as a ratio between the measured luminous intensity of the light 625 emitted by the welding process and the luminous intensity of a reference object (e.g., the sun). In this example, a display element 610 indicates that the brightness of the light 625 emitted during the welding process is ⅛ the brightness of the sun. Thus, in this example, the brightness of the light 625 is conceptualized for the user in comparison to another reference value that the user observed in the past.

In embodiments, the measurement conceptualizer 330 can be configured to retrieve/generate conceptualization data using one or more AI/ML algorithms using historical measurement data 390 as input data. In these embodiments, the AI/ML algorithm (e.g., a neural network) can be trained to determine a reference virtual object to be retrieved/generated to conceptualize the measured quantity based on the AR user's historical measurement data 390. The AI/ML algorithm can be trained to consider various factors within the historical measurement data 390, such as the context in which each previously measured value was recorded, the similarity between previously measured values and the current value, and any reference objects which correspond to the currently measured object/event. The trained AI/ML algorithm can then receive a measured quantity and historical measurement data 390 of the user and automatically retrieve/generate conceptualization data for the AR user based on the trained model.

The AR content generator 335 can be configured to cause display of the measured value, selected UoM, and conceptualization data on the AR device 355. In embodiments, the location of the measured value, UoM, and conceptualization data on the screen of the AR device can be selected/updated based on tracking of the user (e.g., pose tracking or gaze tracking). For example, the position and orientation of the user's head with respect to the measured physical object can be tracked such that the corresponding measurement data can be displayed adjacent to, proximate to, or otherwise spatially related to the measured object on the AR display.

Upon displaying the measured quantity in the preferred UoM with any reference conceptualization data, the AMDMS 305 can monitor future received measurements to determine whether they should be displayed on the AR device. Thus, the AMDMS 305 can be configured to receive sensor data indicating measured values of physical quantities in an AR user's environment continuously, intermittently, periodically, or over any other suitable time interval. Further, the AMDMS 305 can be configured to determine whether display and/or conceptualization of the measured values should be completed over any suitable time interval.

In embodiments, the AMDMS 305 can collect feedback regarding the displayed measured values, displayed UoMs, and/or the displayed conceptualization virtual objects from the user after presentation to the user on the AR device 355. This can aid in modifying criteria used to determine whether to display particular measured values, which UoMs are preferred by the user, and/or which conceptualization techniques/instances were effective for the user. For example, the feedback can be used to change one or more thresholds (e.g., observation frequency thresholds) used to determine whether to display measurements, to determine which UoMs to select, and/or to determine whether to conceptualize measured values. In embodiments, the feedback can be used to alter weights/biases of ML/AI algorithms configured to determine whether to display measured quantities, to select UoMs, to determine whether to conceptualize measured values, and/or for retrieving/generating virtual objects to conceptualize measured values.

Figure 4:
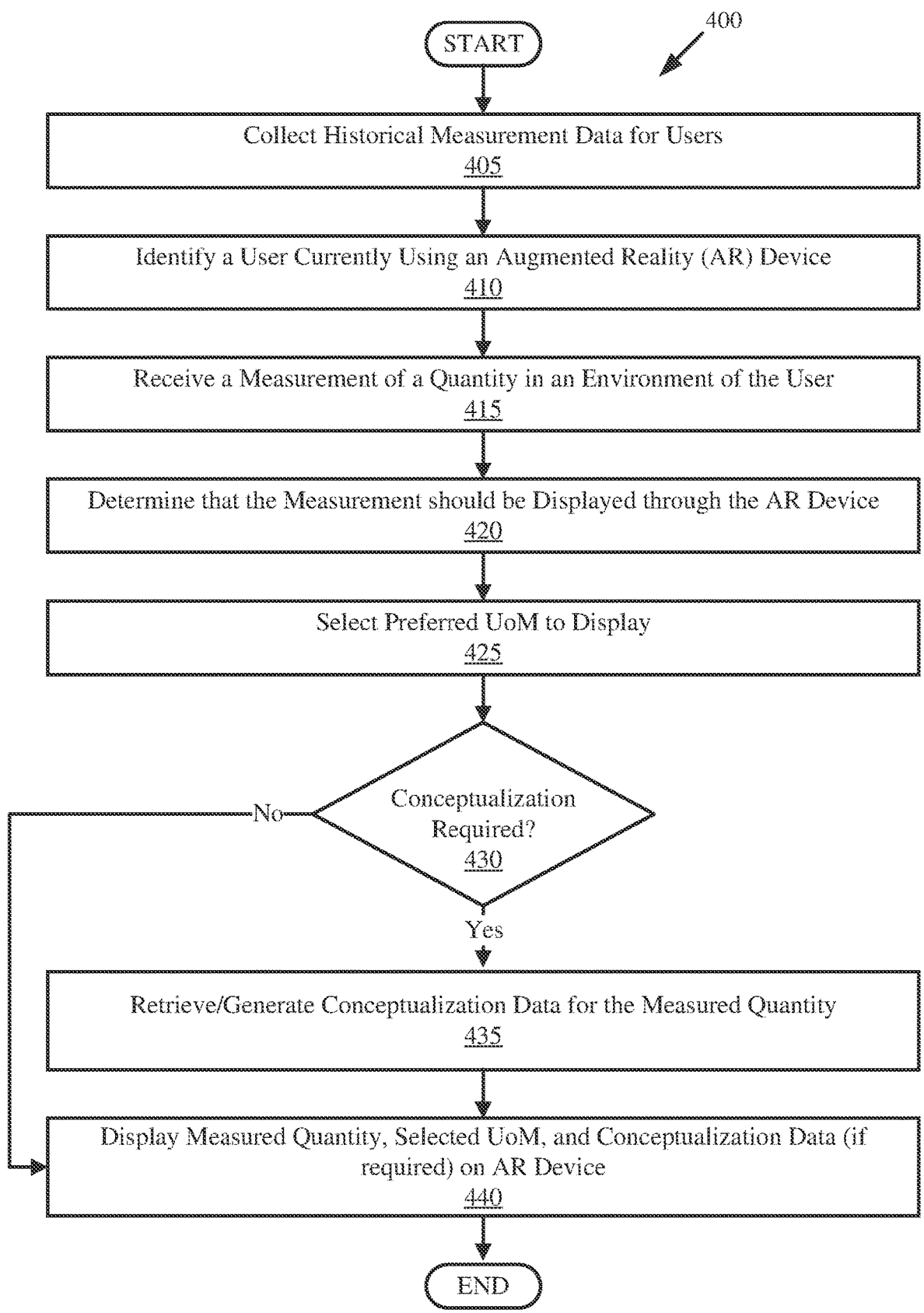
FIG. 4 is a flow-diagram illustrating an example method for AR measurement display management, in accordance with embodiments of the present disclosure.

Referring now to FIG. 4, shown is a flow-diagram of an example method 400 for measurement display management, in accordance with embodiments of the present disclosure. One or more operations of method 400 can be completed by one or more processing circuits (e.g., computer 101, devices 205, server 235, user device 340, AR device 355, AMDMS 305, IoT sensors 395).

Method 400 initiates at operation 405, where historical measurement data for users is collected. The historical measurement data can be collected over any suitable time interval and in any suitable manner (e.g., IoT sensors or manually by users). The historical measurement data can indicate measured values, UoMs of measured values, and context in which measured values were received (e.g., location, time, and context of the measurements). Table 1, referenced above, depicts exemplary historical measurement data for a user. Historical measurement data can be the same as, or substantially similar to, historical measurement data 390 of FIG. 3.

A user currently using an AR device is identified. This is illustrated at operation 410. Identifying the AR user can be completed in the same, or a substantially similar manner, as described with respect to the user identifier 310 of FIG. 3. Identification of the AR user can be used such that historical measurement data corresponding to the AR user can be obtained.

A measurement of a quantity in an environment of the AR user can be received. This is illustrated at operation 415. Measurement of the quantity can be received in the same, or a substantially similar manner, as described with respect to the measurement receiver 315 of FIG. 3. For example, measurements can be received automatically via surrounding sensors (e.g., via IoT sensors) or manually by user measurement (e.g., via electronic/physical measurement instrumentation).

A determination is made that the measurement should be displayed through the AR device. This is illustrated at operation 420. In embodiments, determining that the measurement should be displayed through the AR device can be completed in the same, or a substantially similar manner, as described with respect to the display determiner 320.

A preferred UoM for the measurement that is determined to be displayed on the AR device is then selected. This is illustrated at operation 425. Selecting the preferred UoM can be completed in the same, or a substantially similar manner, as described with respect to the UoM selector 325 of FIG. 3. For example, selecting a preferred UoM can be completed based on UoM use frequency as indicated in historical measurement data. In embodiments, an AI/ML algorithm can be configured to select the preferred UoM.

A determination is then made whether conceptualization of the measured quantity is required. This is illustrated at operation 430. Determining whether conceptualization is required can be completed in the same, or a substantially similar manner, as described with respect to the measurement conceptualizer 330 of FIG. 3. For example, in embodiments, only measured quantities that fall below a threshold observation frequency are determined to be conceptualized.

If a determination is made that conceptualization is required, at operation 430, then conceptualization data is retrieved/generated for the measured quantity. This is illustrated at operation 435. Retrieving/generating conceptualization data can be completed in the same, or a substantially similar manner, as described with respect to the measurement conceptualizer 330 of FIG. 3. For example, one or more virtual objects which correspond to the measured quantity can be retrieved/generated for display on the AR device.

If a determination is made that conceptualization is not required, or after retrieving/generating conceptualization data, the measured quantity, selected UoM, and conceptualization data (if required) are displayed on the AR device. This is illustrated at operation 440. The displayed measured quantity, selected UoM, and conceptualization data can aid the user in understanding the measurement of the object/event in their environment via display through the AR device.

The aforementioned operations can be completed in any order and are not limited to those described. Additionally, some, all, or none of the aforementioned operations can be completed, while still remaining within the spirit and scope of the present disclosure.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to those skilled in the art. Therefore, it is intended that the following claims be interpreted as covering all such alterations and modifications as fall within the true spirit and scope of the disclosure.

Several examples will now be provided to further clarify various aspects of the present disclosure:

Example 1: A method comprising receiving a measurement of a quantity in an environment of a user currently using an augmented reality (AR) device, selecting a preferred unit of measurement (UoM) for the measurement of the quantity based on an analysis of historical data of the user, conceptualizing the measurement of the quantity by obtaining a virtual object associated with the measurement of the quantity, and issuing a command to display, on the AR device, the measurement of the quantity within the preferred UoM and the virtual object associated with the measurement of the quantity.

Example 2: The limitations of Example 1, wherein prior to selecting the preferred UoM of the measurement of the quantity, a determination is made whether the measurement of the quantity should be displayed on the AR device based on an analysis of the historical data of the user.

Example 3: The limitations of any of Examples 1-2, wherein prior to conceptualizing the measurement of the quantity by obtaining the virtual object, a determination is made whether to conceptualize the measurement of the virtual object based on an analysis of the historical data of the user.

Example 4: The limitations of any of Examples 1-3, wherein prior to obtaining the measurement of the quantity, the AR user is identified, wherein the identity of the user is used to obtain a user profile containing historical measurement data associated with the AR user.

Example 5: The limitations of any of Examples 1-4, wherein obtaining the virtual object includes identifying a reference object within historical measurement data of the user that shares the same quantity with a similar value as the measurement of the quantity.

Example 6: The limitations of any of Examples 1-5, wherein the measurement of the quantity is received by an internet of things (IoT) sensor.

Example 7: The limitations of any of Examples 1-6, wherein the preferred UoM is selected using a machine learning algorithm using historical measurement data as input.

Example 8: The limitations of any of Examples 1-5 or 7, wherein the measurement of the quantity is received as manually measured by the user and is recognized via a front facing camera of the AR device.

Example 9: The limitations of any of Examples 1-8, wherein the virtual object associated with the measurement of the quantity is obtained using a machine learning algorithm using historical measurement data as input.

Example 10: A system comprising one or more processor and one or more computer-readable storage media collectively storing program instructions which, when executed by the processor, are configured to cause the processor to perform a method according to any of Examples 1-9 or 15-16.

Example 11: A computer program product comprising one or more computer readable storage media, and program instructions collectively stored on the one or more computer readable storage media, the program instructions comprising instructions configured to cause one or more processors to perform a method according to any one of Examples 1-9 or 15-16.

Example 12: An augmented reality (AR) device comprising one or more processors, a display, a tracking system, and one or more computer-readable storage media collectively storing program instructions which, when executed by the one or more processors, are configured to cause the one or more processors to perform a method comprising determining that a measured quantity of an object viewed through the AR device should be displayed on the display and displaying a preferred unit of measurement (UoM) for the measured quantity and a virtual object associated with the measured quantity in a location on the display based on tracking data received from the tracking system.

Example 13: The limitations of Example 12, wherein the preferred UoM and the virtual object are determined based on historical measurement data associated with a current user of the AR device.

Example 14: The limitations of any of Examples 12-13, wherein the virtual object is identified as a reference object within the historical measurement data of the user that shares the same quantity with a similar value as the measured quantity.

Example 15: A method comprising determining that a measured quantity of an object viewed through an augmented reality (AR) device should be displayed on a display of the AR device and displaying a preferred unit of measurement (UoM) for the measured quantity and a virtual object associated with the measured quantity in a location on the display of the AR device based on tracking data received from a tracking system of the AR device.

Example 16: The limitations of Example 15, wherein the preferred UoM and the virtual object are determined based on historical measurement data associated with a current user of the AR device.

What is claimed is:

1. A method comprising:
receiving a measurement of a quantity in an environment of a user currently using an augmented reality (AR) device;
selecting a preferred unit of measurement (UoM) for the measurement of the quantity based on an analysis of historical data of the user;
conceptualizing the measurement of the quantity by obtaining a virtual object associated with the measurement of the quantity; and
issuing a command to display, on the AR device, the measurement of the quantity within the preferred UoM and the virtual object associated with the measurement of the quantity.

2. The method of claim 1, wherein prior to selecting the preferred UoM of the measurement of the quantity, a determination is made whether the measurement of the quantity should be displayed on the AR device based on an analysis of the historical data of the user.

3. The method of claim 1, wherein prior to conceptualizing the measurement of the quantity by obtaining the virtual object, a determination is made whether to conceptualize the measurement of the virtual object based on an analysis of the historical data of the user.

4. The method of claim 1, wherein prior to obtaining the measurement of the quantity, the AR user is identified, wherein an identity of the user is used to obtain a user profile containing historical measurement data associated with the AR user.

5. The method of claim 1, wherein obtaining the virtual object includes identifying a reference object within historical measurement data of the user that shares the same quantity with a similar value as the measurement of the quantity.

6. The method of claim 1, wherein the measurement of the quantity is received by an internet of things (IOT) sensor.

7. The method of claim 1, wherein the preferred UoM is selected using a machine learning algorithm using historical measurement data as input.

8. A system comprising:
one or more processors; and
one or more computer-readable storage media collectively storing program instructions which, when executed by the one or more processors, are configured to cause the one or more processors to perform a method comprising:
receiving a measurement of a quantity in an environment of a user currently using an augmented reality (AR) device;
selecting a preferred unit of measurement (UoM) for the measurement of the quantity based on an analysis of historical data of the user;
conceptualizing the measurement of the quantity by obtaining a virtual object associated with the measurement of the quantity; and
issuing a command to display, on the AR device, the measurement of the quantity within the preferred UoM and the virtual object associated with the measurement of the quantity.

9. The system of claim 8, wherein prior to selecting the preferred UoM of the measurement of the quantity, a determination is made whether the measurement of the quantity should be displayed on the AR device based on an analysis of the historical data of the user.

10. The system of claim 8, wherein prior to conceptualizing the measurement of the quantity by obtaining the virtual object, a determination is made whether to conceptualize the measurement of the virtual object based on an analysis of the historical data of the user.

11. The system of claim 8, wherein prior to obtaining the measurement of the quantity, the AR user is identified, wherein an identity of the user is used to obtain a user profile containing historical measurement data associated with the AR user.

12. The system of claim 8, wherein obtaining the virtual object includes identifying a reference object within historical measurement data of the user that shares the same quantity with a similar value as the measurement of the quantity.

13. The system of claim 8, wherein the measurement of the quantity is received as manually measured by the user and is recognized via a front facing camera of the AR device.

14. The system of claim 8, wherein the virtual object associated with the measurement of the quantity is obtained using a machine learning algorithm using historical measurement data as input.

15. A computer program product comprising one or more computer readable storage media, and program instructions collectively stored on the one or more computer readable storage media, the program instructions comprising instructions configured to cause one or more processors to perform a method comprising:
receiving a measurement of a quantity in an environment of a user currently using an augmented reality (AR) device;
selecting a preferred unit of measurement (UoM) for the measurement of the quantity based on an analysis of historical data of the user;
conceptualizing the measurement of the quantity by obtaining a virtual object associated with the measurement of the quantity; and
issuing a command to display, on the AR device, the measurement of the quantity within the preferred UoM and the virtual object associated with the measurement of the quantity.

16. The computer program product of claim 15, wherein prior to selecting the preferred UoM of the measurement of the quantity, a determination is made whether the measurement of the quantity should be displayed on the AR device based on an analysis of the historical data of the user.

17. The computer program product of claim 15, wherein prior to conceptualizing the measurement of the quantity by obtaining the virtual object, a determination is made whether to conceptualize the measurement of the virtual object based on an analysis of the historical data of the user.

18. The computer program product of claim 15, wherein prior to obtaining the measurement of the quantity, the AR user is identified, wherein an identity of the user is used to obtain a user profile containing historical measurement data associated with the AR user.

19. The computer program product of claim 15, wherein obtaining the virtual object includes identifying a reference object within historical measurement data of the user that shares the same quantity with a similar value as the measurement of the quantity.

20. The computer program product of claim 15, wherein the virtual object associated with the measurement of the quantity is obtained using a machine learning algorithm using historical measurement data as input.

21. An augmented reality (AR) device comprising:
one or more processors;
a display;
a tracking system; and
one or more computer-readable storage media collectively storing program instructions which, when executed by the one or more processors, are configured to cause the one or more processors to perform a method comprising:
determining that a measured quantity of an object viewed through the AR device should be displayed on the display; and
displaying a preferred unit of measurement (UoM) for the measured quantity and a virtual object associated with the measured quantity in a location on the display based on tracking data received from the tracking system.

22. The AR device of claim 21, wherein the preferred UoM and the virtual object are determined based on historical measurement data associated with a current user of the AR device.

23. The AR device of claim 22, wherein the virtual object is identified as a reference object within the historical measurement data of the user that shares the same quantity with a similar value as the measured quantity.

24. A method comprising:
determining that a measured quantity of an object viewed through an augmented reality (AR) device should be displayed on a display of the AR device; and
displaying a preferred unit of measurement (UoM) for the measured quantity and a virtual object associated with the measured quantity in a location on the display of the AR device based on tracking data received from a tracking system of the AR device.

25. The method of claim 24, wherein the preferred UoM and the virtual object are determined based on historical measurement data associated with a current user of the AR device.

* * * * *